US008664427B2

(12) United States Patent
Schoenfelder et al.

(10) Patent No.: US 8,664,427 B2
(45) Date of Patent: Mar. 4, 2014

(54) PROCESS FOR PREPARING HIGHLY BRANCHED POLYHYDROXYBENZOIC ACID ALKOXYLATES

(75) Inventors: Daniel Schoenfelder, Brussels (BE); Bernd Bruchmann, Freinsheim (DE); Anna Cristadoro, Heppenheim (DE); Achim Loeffler, Speyer (DE); Matthias Schopohl, Dresden (DE); Andreas Kunst, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 145 days.

(21) Appl. No.: 13/497,834

(22) PCT Filed: Oct. 14, 2010

(86) PCT No.: PCT/EP2010/065374
§ 371 (c)(1),
(2), (4) Date: Mar. 23, 2012

(87) PCT Pub. No.: WO2011/045357
PCT Pub. Date: Apr. 21, 2011

(65) Prior Publication Data
US 2012/0197042 A1 Aug. 2, 2012

(30) Foreign Application Priority Data
Oct. 16, 2009 (EP) .................................. 09173299

(51) Int. Cl.
*C07C 67/02* (2006.01)
*C07C 67/03* (2006.01)
(52) U.S. Cl.
USPC ...................... 560/92; 560/8; 560/76; 560/89
(58) Field of Classification Search
None
See application file for complete search history.

(56) References Cited

U.S. PATENT DOCUMENTS

| 2,686,198 | A | 8/1954 | Bock |
| 2009/0118417 | A1 | 5/2009 | Tachikawa et al. |
| 2011/0021686 | A1 | 1/2011 | Jain et al. |
| 2011/0021687 | A1 | 1/2011 | Jain et al. |
| 2011/0201745 | A1 | 8/2011 | Roller et al. |
| 2011/0272327 | A1 | 11/2011 | Bruchmann et al. |
| 2012/0054920 | A1 | 3/2012 | Tuerk et al. |

FOREIGN PATENT DOCUMENTS

| DE | 273 841 | 11/1989 |
| EP | 2 003 158 | 12/2008 |
| WO | 2009 080787 | 7/2009 |
| WO | 2009 109622 | 9/2009 |
| WO | 2009 127614 | 10/2009 |
| WO | 2011 009766 | 1/2011 |

OTHER PUBLICATIONS

Turner et al. Macromolecules (1994), vol. 27, pp. 1611-1616.*
U.S. Appl. No. 13/813,300, filed Jan. 30, 2013, Loeffler, et al.
U.S. Appl. No. 13/440,463, filed Apr. 5, 2012, Henningsen, et al.
Hawker, C.J., et al., "Hyperbranched Poly(ethylene glycol)s: A New Class of Ion-Conducting Materials," Macromolecules, vol. 29, No. 11, pp. 3831-3838, (May 20, 1996).
Hoetler, D., et al., "Degree of branching in hyperbranched polymers," Acta Polymer, vol. 48, pp. 30-35, (1997).
Flory, P.J., "Molecular Size Distribution in Three Dimensional Polymers. VI. Branched Polymers Containing A-R-B$_{f-1}$ Type Units," Journal of the American Chemical Society, Vo. 74, pp. 2718-2723, (Jun. 5, 1952).
Sunder, A., et al., "Controlling the Growth of Polymer Trees: Concepts and Perspectives for Hyperbranched Polymers," Chem. Eur. J., vol. 6, No. 14, pp. 2499-2506, (2000).
Malmstroem, E., et al., "Hyperbranched Polymers: A Review," J.M.S.—Rev. Macromol. Chem. Phys., vol. C37, No. 3, pp. 555-579, (1997).
Lange, W., et al., "Darstellung und Eigenschaften von aus Vanillin und Syringaaldehyd erhaeltlichen Polyestern," Holz als Roh-und Werkstoff, vol. 39, pp. 107-112, (1981).
International Search Report Issued Jan. 31, 2011 in PCT/EP10/65374 Filed Oct. 14, 2010.
U.S. Appl. No. 13/376,226, filed Dec. 5, 2011, Jung, et al.

* cited by examiner

*Primary Examiner* — Patrick Lewis
(74) *Attorney, Agent, or Firm* — Oblon, Spivak, McClelland, Maier & Neustadt, L.L.P.

(57) ABSTRACT

The invention relates to a process for preparing hyperbranched polyhydroxybenzoic acid alkoxylates, comprising the steps of:
(a) reacting at least one polyhydroxybenzoic ester with one or more alkylene oxides, optionally in the presence of a basic catalyst,
(b) allowing the polyhydroxybenzoic ester alkoxylates formed in step (a) to react with transesterification to form hyperbranched polyhydroxybenzoic acid alkoxylates.

18 Claims, No Drawings

...

PROCESS FOR PREPARING HIGHLY BRANCHED POLYHYDROXYBENZOIC ACID ALKOXYLATES

The invention relates to a process for preparing hyperbranched polyhydroxybenzoic acid alkoxylates.

Dendrimers, arborols, starburst polymers or hyperbranched polymers are names for polymers which feature a highly branched structure and a high functionality. Dendrimers are molecularly homogeneous macromolecules with a highly symmetric structure. Dendrimers can be prepared, proceeding from a central molecule, by controlled stepwise linkage of polyfunctional monomers to already bonded monomers. With each linkage step, this multiplies the number of monomer end groups (and hence of the linkages) by the factor of 2 or higher, and monodisperse polymers built up generation by generation with treelike structures, which are ideally spherical and whose branches in each case comprise exactly the same number of monomer units, are obtained. However, the preparation of the monodisperse dendrimers is complicated by the fact that protecting groups have to be introduced and removed again in each linkage step and intensive cleaning operations are required before the start of each new growth stage, and dendrimers are therefore typically prepared only on the laboratory scale.

The generation-by-generation buildup described is required in order to obtain dendrimeric structures with a completely regular structure.

In contrast, hyperbranched polymers are both molecularly and structurally inhomogeneous. They are not obtained by being built up generation by generation. It is therefore also unnecessary to isolate and to purify intermediates. Hyperbranched polymers can be obtained by simply mixing the components required to form them and the reaction thereof in a so-called one-pot reaction. Hyperbranched polymers may have dendrimeric substructures. In addition, however, they also have linear polymer chains and nonidentical polymer branches. For the synthesis of the hyperbranched polymers, especially so-called $AB_x$ monomers are suitable. These have two different functional groups A and B in one molecule, which can react intermolecularly with one another to form a bond. Functional group A is present only once per molecule, and functional group B twice or more than twice. The reaction of said $AB_x$ monomers with one another forms uncrosslinked polymers with branching sites in a regular arrangement. The polymers have almost exclusively B groups at the chain ends.

In addition, hyperbranched polymers can be prepared via the $A_x+B_y$ synthesis route. In this case, $A_x$ and $B_y$ represent two different monomers with the functional groups A and B, and the indices x and y the number of functional groups per monomer. In the $A_x+B_y$ synthesis, represented here using the example of an $A_2+B_3$ synthesis, a difunctional monomer $A_2$ is reacted with a trifunctional monomer $B_3$. This initially forms a 1:1 adduct of A and B with an average of one functional A group and two functional B groups, which can then likewise react to give a hyperbranched polymer. The hyperbranched polymers thus obtained also have predominantly B groups as end groups.

In the context of the invention, the term "hyperbranched" in connection with the polymers means that the degree of branching (DB) of the substances in question, which is defined as $$DB\,(\%) = \frac{T+Z}{T+Z+L} \times 100,$$

where T is the mean number of terminally bound monomer units, Z is the mean number of monomer units which form branches and L is the mean number of monomer units bonded linearly into the macromolecules of the particular substances, is from 10 to 95%, preferably 25 to 90% and more preferably from 30 to 80%.

The nondendrimeric hyperbranched polymers differ from the dendrimeric polymers by virtue of the degree of branching thus defined. The polymers are dendrimeric when their degree of branching DB=99 to 100%. A dendrimer thus has the maximum possible number of branching sites, which can be achieved only by highly symmetric buildup. For a definition of the degree of branching, see also H. Frey et al., Acta Polym. 1997, 48, 30.

In the context of this invention, hyperbranched polymers are thus understood to mean essentially uncrosslinked macromolecules which are structurally inhomogeneous. They can, proceeding from a central molecule, be formed analogously to dendrimers, but with inhomogeneous chain length of the branches. However, they can also be formed linearly with functional pendent branches or have linear and branched molecular moieties. For a definition of dendrimeric and hyperbranched polymers, see also P. J. Flory, J. Am. Chem. Soc. 1952, 74, 2718 and H. Frey et al., Chem. Eur. J. 2000, 6, No. 14, 2499. Further information about hyperbranched polymers and synthesis thereof can be found, for example, in J.M.S.—Rev. Macromol. Chem. Phys., C37(3), 555 to 579 (1997) and the literature cited there.

C. J. Hawker et al., Hyperbranched Poly(ethylene glycol)s: A New Class of Ion-Conducting Polymers", Macromolecules 1996, 29, 3831-3838, describe the preparation of hyperbranched polyether esters based on oligoethylene glycols and methyl 3,5-dihydroxybenzoate. In a multistage synthesis, $AB_2$ macromonomers based on methyl 3,5-dihydroxybenzoate and oligoethylene glycol are first prepared. Proceeding from commercially available di-, tri- or hexaethylene glycols, by reaction with one equivalent of tert-butyldiphenylchlorosilane in the presence of triethylamine, an oligoethylene glycol protected at one chain end is prepared. At the other chain end, by bromination with tetrabromomethane and triphenylphosphine, the hydroxyl group is replaced by a bromine atom. Finally, the oligoethylene glycol thus derivatized is reacted with methyl 3,5-dihydroxybenzoate in the presence of potassium carbonate and 18-crown-6. Finally, the silane protecting groups are eliminated again with hydrogen chloride in methanol. The $AB_2$ macromonomer thus obtained is isolated and then polycondensed in the presence of catalytic amounts of dibutyltin diacetate at 160° C. in the absence of a solvent to give hyperbranched polyether ester.

W. Lange and O. Kordsachia, Darstellung und Eigenschaften von aus Vanillin und Syringaaldehyd erhältlichen Polyestern [Preparation and properties of polyesters obtainable from vanillin and syringa aldehyde], Holz als Roh-und Werkstoff 39 (1981) 107 to 112, describe the preparation of polyesters based on vanillic acid (4-hydroxy-3-methoxybenzoic acid) or syringic acid (4-hydroxy-3,5-dimethoxybenzoic acid) by condensation of hydroxyethylvanillic acid or hydroxyethylsyringic acid to give the linear polyester. Hydroxyethylvanillic acid or hydroxyethylsyringic acid are obtained in an upstream synthesis stage by reacting the sodium salt of vanillic acid or syringic acid with 1 mol of ethylene oxide. The hydroxyethyl ether acids are released from the sodium salts by adding dilute sulfuric acid. In one example, vanillic acid or syringic acid is dissolved in sodium hydroxide solution, and ethylene oxide is introduced into the solution at 80° C. The hydroxyethyl ether acids are precipitated by adding dilute sulfuric acid, and the precipitated product is filtered off, washed with water, dried and finally purified by repeated recrystallization. The polyester formation is finally carried out as a melt condensation under reduced pressure.

The preparation of linear polyesters by polycondensation of hydroxyethylvanillic acid by melt condensation at temperatures of 200 to 300° C. under reduced pressure is also described in U.S. Pat. No. 2,686,198.

DD 273 841 relates to the alkoxylation of gallic acid or gallic acid derivatives with propylene oxide, ethylene oxide, epichlorohydrin or tetrahydrofuran. The gallic acid derivative used is preferably n-propyl gallate. In the working examples, gallic acid is reacted in an autoclave with ethylene oxide, propylene oxide or tetrahydrofuran. In the case of propylene oxide in the presence of potassium hydroxide and in the case of tetrahydrofuran, operation is effected in the presence of boron trifluoride etherate as a catalyst. The formation of polyether esters from the gallic acid alkoxylates is not described.

It is an object of the invention to provide a very simply performable process for preparing hyperbranched polyhydroxybenzoic acid alkoxylates.

The object is achieved by a process for preparing hyperbranched polyhydroxybenzoic acid alkoxylates, comprising the steps of (a) reacting at least one polyhydroxybenzoic ester with one or more alkylene oxides, optionally in the presence of a basic catalyst, (b) allowing the polyhydroxybenzoic acid alkoxylates formed in step (a) to react with transesterification to form hyperbranched polyhydroxybenzoic acid alkoxylates.

The process according to the invention is notable for its surprising simplicity. The polyhydroxybenzoic ester alkoxylates formed in step (a) directly react further with transesterification to give the hyperbranched polyhydroxybenzoic acid alkoxylates. The process according to the invention can thus be performed in one stage as what is known as a one-pot process. Isolation of the intermediate formed in step (a) is not required.

In general, the polyhydroxybenzoic ester is reacted with the alkylene oxide(s) under pressure, optionally in the presence of the basic catalyst, in an autoclave. The pressure during the alkoxylation step a) is typically 1 to 15 bar, preferably 3 to 8 bar, and the temperature is 60 to 180° C., preferably 90 to 120° C. Under these conditions, the polyhydroxybenzoic acid alkoxylates formed in situ react further with transesterification to give the hyperbranched polyether esters, such that steps (a) and (b) proceed partly in parallel.

In general, the reaction is performed in the absence of a solvent. However, it is also possible to work in the presence of a solvent. Suitable solvents are toluene, xylene and other inert aromatic hydrocarbons, THF, dioxane, other cyclic inert ethers, DMSO and NMP.

For formation of hyperbranched structures, at least some of the polyhydroxybenzoic esters used have at least 2 OH groups. In general, the polyhydroxybenzoic esters used have 2 or 3 OH groups. Examples of suitable polyhydroxybenzoic esters are the esters of 2,3-, 2,4-, 2,5- and 2,6-dihydroxybenzoic acid, of 3,4- and 3,5-dihydroxybenzoic acid, of 3,4,5-trihydroxybenzoic acid (gallic acid), of 1,3,4,5-tetrahydroxybenzoic acid and of 1,2,3,4,5-pentahydroxybenzoic acid.

Preference is given to the esters of gallic acid. It is also possible to use mixtures of the polyhydroxybenzoic esters mentioned.

In general, the alkyl esters of the polyhydroxybenzoic acids are reacted, preferably the $C_1$-$C_6$-alkyl esters. In the case of the methyl esters, there may also be alkoxylation of the carboxymethyl group; the polyalkylene glycol ether esters (which have the —C(O)O—[CH$_2$CHRO]$_n$—H(Me) group) formed in this case cannot be transesterified as efficiently. Preference is therefore given to the alkyl esters from $C_2$-alkyl. Particular preference is given to the propyl and butyl esters of the polyhydroxybenzoic acids.

The polyhydroxybenzoic ester is reacted in step (a) with one or more alkylene oxides, optionally in the presence of a basic catalyst. Preferred alkylene oxides are ethylene oxide, propylene oxide, butylene oxide and styrene oxide, particular preference being given to ethylene oxide and propylene oxide. It is also possible to react mixtures of alkylene oxides. Suitable basic catalysts are sodium hydroxide, potassium hydroxide, cesium hydroxide, alkali metal alkoxides, for example potassium methoxide and potassium tert-butoxide, and also amine catalysts, for example dimethylcyclohexylamine, dimethylethanolamine, imidazole, substituted imidazoles and guanidine derivatives. The ethoxylation of gallic acid does not require, for example, a basic catalyst.

In general, the formation of the hyperbranched polyhydroxybenzoic acid alkoxylates is completed in step (b) after the alkylene oxide addition has ended by simply allowing the reaction mixture to react further. This further reaction time may be a few hours, for example 1 to 3 hours. The alkylene oxide is generally added over a period of 0.25 to 8 hours, preferably 0.5 to 5 hours. The total reaction time (steps a) and b)) is generally 1.5 to 15 and preferably 2 to 6 hours. In general, 1 to 15 mol, preferably 1 to 10 mol and more preferably 1 to 5 mol of alkylene oxide are reacted per mole of hydroxyl groups of the polyhydroxybenzoic acid.

After the reaction is over, the autoclave is decompressed and the product mixture is stripped to remove residual monomer. The workup is effected at temperatures of 80-160° C. and pressures of 5-300 mbar. Optionally, the removal of the alkylene oxide can also be supported by an additional inert stripping gas, such as steam or nitrogen.

Optionally, disruptive cations, for example alkali metal ions, can be removed by acidic ion exchangers, by stirring with adsorbents, for example magnesium silicates, or by extraction.

The hyperbranched polyhydroxybenzoic acid alkoxylates obtained generally have a number-average molecular weight in the range from 500 to 7000 g/mol and a polydispersity in the range from 1 to 4.

The invention is illustrated in detail by the examples which follow.

EXAMPLES

The products were analyzed in electrospray ionization mass spectrometry (ESI-MS) and with gel permeation chromatography-ESI-MS coupling, using tetrahydrofuran as the solvent.

The OH number was determined by titration to the DIN 53 240 method.

Example 1

A 300 ml autoclave is initially charged with 24.87 g (0.135 mol) of methyl gallate and 0.3 g (0.0043 mol) of potassium methoxide. The autoclave is inertized with nitrogen. The mixture is dried at 130° C. under reduced pressure (<15 mbar) for 2 hours. Subsequently, nitrogen is injected and the autoclave is decompressed to 3.5 bar. At a temperature of 130° C., the ethylene oxide addition is started, and a significant pressure rise is observed. After a certain time, the temperature rises abruptly. Once the entire amount of ethylene oxide has been metered in (72.12 g corresponding to 1.75 mol), the mixture is allowed to react further for another hour. A product with an OH number of 236 mg KOH/g is obtained.

The product is analyzed by means of MALDI-ToF analysis using hydroxybenzylidene-malonitrile (HBM) as the matrix. Hyperbranched oligomers with n=1, 2, 3, . . . 11 repeat units are detected, the main component having n=8 repeat units. Each repeat unit comprises an average of 7 to 8 ethylene oxide units.

Example 2

A 300 ml autoclave is initially charged with 24.88 g (0.135 mol) of methyl gallate and 0.98 g (0.011 mol) of dimethylethanolamine. The autoclave is inertized with nitrogen. After injecting nitrogen, the autoclave is decompressed to 3.5 bar. At a temperature of 100° C., the addition of a total of 137.7 g (3.13 mol) of ethylene oxide is commenced. The pressure rises rapidly; after a short time, the temperature also rises abruptly. After the ethylene oxide addition has ended, the mixture is allowed to react further for another 2 hours. A product is obtained with an OH number of 264 mg KOH/g.

Example 3

A 300 ml autoclave is initially charged with 62.9 g (0.296 mol) of propyl gallate and 0.68 g (0.006 mol) of potassium tert-butoxide. The autoclave is inertized with nitrogen. The reaction mixture is dried at 130° C. under reduced pressure (<15 mbar). After injection of nitrogen, the autoclave is decompressed to 3.5 bar. At 130° C., the addition of a total of 157.14 g (2.71 mol) of propylene oxide is commenced. After a reaction time of 19 hours, a product with an OH number of 238 mg KOH/g is obtained.

Example 4

A 300 ml autoclave is initially charged with 62.9 g (0.296 mol) of propyl gallate and 0.66 g (0.006 mol) of potassium tert-butoxide. The autoclave is inertized with nitrogen. The reaction mixture is dried at 110° C. under reduced pressure (<15 mbar). After injection of nitrogen, the autoclave is decompressed to 3.5 bar. At 110° C., the addition of a total of 157.14 g (3.57 mol) is commenced. After adding about half the amount of ethylene oxide, an abrupt pressure and temperature rise is observed. After adding the total amount of ethylene oxide, the ethylene oxide is depleted rapidly, and after a reaction time totaling 10 hours a product with an OH number of 220 mg KOH/g is obtained.

The product is analyzed by means of MALDI-ToF analysis using hydroxybenzylidene-malonitrile (HBM) as the matrix. Oligomers with n=1 to 11 repeat units are detected. Each repeat unit comprises an average of approx. 7 to 8 ethylene oxide units. No by-products are detected.

The distribution of the individual oligomers is determined by means of GPC-MS. The maximum in the distribution is at n=8 (octamer).

The invention claimed is:

1. A process for preparing a hyperbranched polyhydroxybenzoic acid alkoxylate, comprising:
    (a) reacting a polyhydroxybenzoic ester with an alkylene oxide, optionally in the presence of a basic catalyst, to obtain a polyhydroxybenzoic ester alkoxylate,
    (b) reacting the polyhydroxybenzoic ester alkoxylate obtained in (a) by transesterification to obtain a hyperbranched polyhydroxybenzoic acid alkoxylate, wherein the process is performed in one stage without isolation of an intermediate formed in (a).

2. The process of claim 1, wherein the polyhydroxybenzoic ester has 2 to 3 OH groups.

3. The process of claim 2, wherein the polyhydroxybenzoic ester is a gallic ester.

4. The process claim 1, wherein the polyhydroxybenzoic ester is a $C_1$-$C_6$-alkyl polyhydroxybenzoate.

5. The process claim 1, wherein the polyhydroxybenzoic ester is a propyl or butyl polyhydroxybenzoate.

6. The process claim 1, wherein the alkylene oxide is at least one selected from the group consisting of ethylene oxide, propylene oxide, butylene oxide and styrene oxide.

7. The process claim 1, comprising reacting the polyhydroxybenzoic ester with the alkylene oxide in the presence of a basic catalyst, wherein the basic catalyst is an alkali metal hydroxide, an alkali metal alkoxide or an amine.

8. The process claim 1, wherein 1 to 15 mol of the alkylene oxide are converted in (a) per mole of OH groups of the polyhydroxybenzoic ester.

9. The process of claim 1, comprising reacting the polyhydroxybenzoic ester with the alkylene oxide in the presence of a basic catalyst.

10. The process of claim 1, wherein the hyperbranched polyhydroxybenzoic acid alkoxylate obtained has a number-average molecular weight of 500 to 7000 g/mol.

11. The process of claim 1, wherein the hyperbranched polyhydroxybenzoic acid alkoxylate obtained has a polydispersity of 1 to 4.

12. The process of claim 1, wherein the polyhydroxybenzoic ester is a gallic ester, and the alkylene oxide is at least one selected from the group consisting of ethylene oxide, propylene oxide, butylene oxide and styrene oxide.

13. The process of claim 1, wherein the polyhydroxybenzoic ester is a gallic ester, and the alkylene oxide is ethylene oxide, propylene oxide, or a mixture of both.

14. The process of claim 1, wherein the alkylene oxide is ethylene oxide, propylene oxide, or a mixture of both.

15. The process of claim 9, wherein the polyhydroxybenzoic ester is methyl gallate, the alkylene oxide is ethylene oxide, and the basic catalyst is potassium methoxide.

16. The process of claim 9, wherein the polyhydroxybenzoic ester is methyl gallate, the alkylene oxide is ethylene oxide, and the basic catalyst is dimethylethanolamine.

17. The process of claim 9, wherein the polyhydroxybenzoic ester is propyl gallate, the alkylene oxide is propylene oxide, and the basic catalyst is potassium tert-butoxide.

18. The process of claim 9, wherein the polyhydroxybenzoic ester is propyl gallate, the alkylene oxide is ethylene oxide, and the basic catalyst is potassium tert-butoxide.

* * * * *